United States Patent
Zhai et al.

(10) Patent No.: US 11,349,116 B2
(45) Date of Patent: May 31, 2022

(54) MOS$_x$O$_y$/CARBON NANOCOMPOSITE MATERIAL, PREPARATION METHOD THEREFOR AND USE THEREOF

(71) Applicant: PEKING UNIVERSITY, Beijin (CN)

(72) Inventors: Maolin Zhai, Beijing (CN); Pengfei Cao, Beijing (CN); Jing Peng, Beijing (CN); Jiuqiang Li, Beijing (CN)

(73) Assignee: Peking University, Beijing (CN)

(*) Notice: Subject to any disclaimer, the term of this patent is extended or adjusted under 35 U.S.C. 154(b) by 799 days.

(21) Appl. No.: 16/320,450

(22) PCT Filed: Jul. 25, 2017

(86) PCT No.: PCT/CN2017/094333
§ 371 (c)(1),
(2) Date: Jan. 24, 2019

(87) PCT Pub. No.: WO2018/019234
PCT Pub. Date: Feb. 1, 2018

(65) Prior Publication Data
US 2019/0237751 A1    Aug. 1, 2019

(30) Foreign Application Priority Data
Jul. 27, 2016 (CN) .......... 201610600352.X

(51) Int. Cl.
| | | |
|---|---|---|
| H01M 4/90 | (2006.01) | |
| H01M 4/86 | (2006.01) | |
| C01G 39/00 | (2006.01) | |
| H01M 4/1397 | (2010.01) | |
| C01G 39/06 | (2006.01) | |
| C25B 1/04 | (2021.01) | |
| H01M 8/1004 | (2016.01) | |
| H01M 4/88 | (2006.01) | |
| C01B 32/15 | (2017.01) | |
| H01M 4/58 | (2010.01) | |
| H01M 4/583 | (2010.01) | |
| H01M 8/0202 | (2016.01) | |
| H01M 4/02 | (2006.01) | |

(52) U.S. Cl.
CPC .......... *H01M 4/1397* (2013.01); *C01B 32/15* (2017.08); *C01G 39/06* (2013.01); *C25B 1/04* (2013.01); *H01M 4/583* (2013.01); *H01M 4/5815* (2013.01); *H01M 4/86* (2013.01); *H01M 4/8647* (2013.01); *H01M 4/8825* (2013.01); *H01M 4/90* (2013.01); *H01M 4/9016* (2013.01); *H01M 4/9083* (2013.01); *H01M 8/1004* (2013.01); *H01M 8/0202* (2013.01); *H01M 2004/028* (2013.01); *H01M 2220/30* (2013.01); *Y02E 60/36* (2013.01)

(58) Field of Classification Search
CPC .. H01M 4/1397; H01M 4/5815; H01M 4/583; H01M 4/86; H01M 4/8647; H01M 4/8825; H01M 4/90; H01M 4/9016; H01M 4/9083; H01M 8/1004; H01M 8/0202; H01M 2004/028; H01M 2220/30; C01B 32/15; C01G 39/06; C25B 1/04; Y02E 60/36

See application file for complete search history.

(56) References Cited

U.S. PATENT DOCUMENTS

2013/0068613 A1    3/2013 Hu et al.

FOREIGN PATENT DOCUMENTS

| CN | 102142537 A | 8/2011 |
|---|---|---|
| CN | 103000887 A | 3/2013 |

(Continued)

OTHER PUBLICATIONS

X-ray photoelectron spectroscopy characterization of amorphous molybdenum oxysulfide thin films, Benoist et al., Thin Solid Films 258 (1995) 110-114.*

Bao et al., "Amorphous oxygen-rich molybdenum oxysulfide Decorated p-type silicon microwire Arrays for efficient photoelectrochemical water reduction," Nano Energy 16: 130-142 (2015).

Cao et al., "Tuning the Composition and Structure of Amorphous Molybdenum Sulfide/Carbon Black Nanocomposites by Radiation Technique for Highly Efficient Hydrogen Evolution," Scientific Reports 7: 16048 (2017)—11 pgs.

Giuffredi et al., "Non-Equilibrium Synthesis of Highly Active Nanostructured, Oxygen-Incorporated Amorphous Molybdenum Sulfide HER Electrocatalyst," *Nano • Micro Small* 16(44): 202004047 (2020)—18 pgs.

Shin et al., "Effect of Oxygen Incorporation in Amorphous Molybdenum Sulfide on Electrochemical Hydrogen Evolution," *Applied Surface Science* 487: 981-989 (2019).

(Continued)

*Primary Examiner* — Haidung D Nguyen
(74) *Attorney, Agent, or Firm* — Leydig, Voit & Mayer, Ltd.

(57) ABSTRACT

Provided are a MoS$_x$O$_y$/carbon nanocomposite material, a preparation method therefor and a use thereof. In the MoS$_x$O$_y$/carbon nanocomposite material, $2.5 \leq x \leq 3.1$, $0.2 \leq y \leq 0.7$, and the mass percent of MoS$_x$O$_y$ is 5%-50% based on the total mass of the nanocomposite material. When the MoS$_x$O$_y$/carbon nanocomposite material is used as a catalyst for an electrocatalytic hydrogen evolution reaction, the current density is 150 mA/cm$^2$ or more at an overpotential of 300 mV. The difference between this performance and the performance of a commercial 20% Pt/C catalyst is relatively small, or even equivalent; and this performance is far better than the catalytic performance of an existing MOS$_2$ composite material. The MoS$_x$O$_y$/carbon nanocomposite material also has a good catalytic stability, and after 8,000 catalytic cycles, the current density thereof is only decreased by 3%, thus exhibiting a very good catalytic performance and cycle stability.

20 Claims, 3 Drawing Sheets

(56) References Cited

FOREIGN PATENT DOCUMENTS

| CN | 104525185 A | 4/2015 |
|---|---|---|
| CN | 105098151 A | 11/2015 |
| CN | 105200450 A | 12/2015 |
| CN | 105680060 A | 6/2016 |
| CN | 106960948 A | 7/2017 |
| JP | 2012-119078 A | 6/2012 |
| KR | 20140008205 A | 1/2014 |

OTHER PUBLICATIONS

Japan Patent Office, Decision to Grant a Patent in Japanese Patent Application No. 2019-503982 (dated Nov. 4, 2020).

Benck et al., "Amorphous Molybdenum Sulfide Catalysts for Electrochemical Hydrogen Production: Insights into the Origin of their Catalytic Activity," *ACS Catalysis* 2(9): 1916-1923 (2012).

Benson et al., "Electrocatalytic Hydrogen Evolution Reaction on Edges of a Few Layer Molybdenum Disulfide Nanodots," *ACS Applied Materials & Interfaces* 7(25): 14113-14122 (2015).

Bindumadhavan et al., "$MoS_2$-MWCNT hybrids as a superior anode in lithium-ion batteries," *Chem. Commun.* 49: 1823-1825 (2013).

Guo et al., "Hollow Structured Micro/Nano $MoS_2$ Spheres for High Electrocatalytic Activity Hydrogen Evolution Reaction," *ACS Applied Materials & Interfaces* 8(8): 5517-5525 (2016).

Hinnemann et al., "Biomimetic Hydrogen Evolution: $MoS_2$ Nanoparticles as Catalyst for Hydrogen Evolution," *J. Am. Chem. Soc.* 127(15): 5308-5309 (2005).

Kibsgaard et al., "Engineering the surface structure of $MoS_2$ to preferentially expose active edge sites for electrocatalysis," *Nature Materials* 11(11): 963-969 (2012).

Lai et al., "Electronic Structure and Photoelectric Properties of O-and Se-doped Single-layer $MoS_2$," *Material Review* 29(9): 152-155, 159 (2015).

Li et al., "Molybdenum Sulfide/N-Doped CNT Forest Hybrid Catalysts for High-Performance Hydrogen Evolution Reaction," *Nano Letters* 14(16): 1228-1233 (2014).

Li et al., "$MoS_2$ Nanoparticles Grown on Graphene: An Advanced Catalyst for the Hydrogen Evolution Reaction," *J. Am. Chem. Soc.* 133(19): 7296-7299 (2011).

Li et al., "Selective hydrodesulfurization of gasoline on Co/$MoS_{2\pm x}$ catalyst: Effect of sulfur defects in $MoS_{2\pm x}$," *Applied Catalysis A: General* 524: 66-76 (2016).

Lukowski et al., "Enhanced Hydrogen Evolution Catalysis from Chemically Exfoliated Metallic $MoS_2$ Nanosheets," *Journal of the American Chemical Society* 135(28): 10274-10277.

Schmidt et al., "Amorphous molybdenum oxysulfide thin films and their physical characterization," *Thin Solid Films*, 260: 21-25 (1995).

Shi et al., "Hot Electron of Au Nanorods Activates the Electrocatalysis of Hydrogen Evolution on MoS2 Nanosheets," *Journal of the American Chemical Society* 137(23): 7365-7370 (2015).

Wang et al., "Enhanced electrocatalytic activity for hydrogen evolution reaction from self-assembled monodispersed molybdenum sulfide nanoparticles on an Au electrode," *Energy & Environmental Science* 6(2): 625-633 (2013).

Xie et al., "Defect-rich $MoS_2$ ultrathin nanosheets with additional active edge sites for enhanced electrocatalytic hydrogen evolution," *Advanced Materials* 25(40): 5807-5813 (2013).

Xie et al., "Function-oriented design and electrochemical properties of two-dimensional crystals," *Science Engineering (A), China Doctoral Dissertations Full-Text Database* 10, Chapters 2, 3 (2014).

Zhao et al., "Controlled synthesis and hydrogen evolution catalysis research of MoS2 composites," *Science Engineering (A), China Doctoral Dissertations Full-Text Database* 7: 39 (2016).

Zhao et al., "$MoS_2$ Nanosheets Supported on 3D Graphene Aerogel as a Highly Efficient Catalyst for Hydrogen Evolution," *Chemistry—A European Journal* 21(45): 15908-15913 (2015).

Zheng et al., "Space-Confined Growth of $MoS_2$ Nanosheets within Graphite: The Layered Hybrid of $MoS_2$ and Graphene as an Active Catalyst for Hydrogen Evolution Reaction," *Chemistry of Materials* 26(7): 2344-2353 (2014).

Nikam et al., "Three-Dimensional Heterostructures of $MoS_2$ Nanosheets on Conducting $MoO_2$ as an Efficient Electrocatalyst To Enhance Hydrogen Evolution Reaction," *ACS Appl. Mater. Interfaces* 7: 23328-23335 (2015).

Xie et al., "Vertically aligned oxygen-doped molybdenum disulfide nanosheets grown on carbon cloth realizing robust hydrogen evolution reaction," *Inorg. Chem. Front.* 3(19): 1160-1166 (2016).

Yang et al., "Preparation of layered $MoS_2$/Graphene films and their electrocatalytic performance of hydrogen generation," *Journal of Beijing University of Aeronautics and Astronautics* 41(11): 2158-2165 (2015).

State Intellectual Property Office of the People's Republic of China, International Search Report in International Application No. PCT/CN2017/094333 (dated Nov. 1, 2017).

State Intellectual Property Office of the People's Republic of China, Written Opinion in International Application No. PCT/CN2017/094333 (dated Nov. 1, 2017).

International Bureau of WIPO, International Preliminary Report on Patentability in International Application No. PCT/CN2017/094333 (dated Jan. 29, 2019).

State Intellectual Property Office of the People's Republic of China, International Search Report in International Application No. PCT/CN2017/094308 (dated Dec. 7, 2017).

State Intellectual Property Office of the People's Republic of China, Written Opinion in International Application No. PCT/CN2017/094308 (dated Dec. 7, 2017).

International Bureau of WIPO, International Preliminary Report on Patentability in International Application No. PCT/CN2017/094308 (dated Jan. 29, 2019).

\* cited by examiner

$MoS_xO_y$/CARBON NANOCOMPOSITE MATERIAL, PREPARATION METHOD THEREFOR AND USE THEREOF

The present application is the U.S. national phase of International Application No. PCT/CN2017/094333, filed on Jul. 25, 2017, which claims the priority of the Chinese patent application No. 201610600352.X with the title of "$MoS_xO_y$/carbon nanocomposite material, preparation method therefor and use thereof", filed before the SIPO on Jul. 27, 2016, the disclosures of which are incorporated herein by reference in their entireties for all purposes.

FIELD OF THE INVENTION

The present application relates to the field of composite materials, and particularly to a $MoS_xO_y$/carbon nanocomposite material, preparation method therefor and use thereof.

BACKGROUND OF THE INVENTION

Hydrogen, as a clean new energy source, has great significance for environmental protection and energy security. How to prepare hydrogen on a large scale is a fundamental problem for the commercial use of hydrogen energy. Hydrogen Evolution Reaction (HER) is considered as a feasible solution for a large-scale production of hydrogen, but the reaction has a higher cathode overpotential on the cathode, resulting in a significant increase in the energy costs for hydrogen preparation. Platinum-based noble metal, as a catalyst for this reaction, can well reduce the cathode overpotential, but it cannot meet the requirements of large-scale applications due to the limited reserves of platinum-based noble metals on the earth. Therefore, it becomes the researchers' focus for seeking alternative catalytic materials to reduce the cathode overpotential so as to reduce the production cost.

Molybdenum disulfide ($MoS_2$) is a compound with a graphite-like layered structure. A molybdenum disulfide bulk, when used as a catalyst for HER, results in a relatively high overpotential. The physicochemical properties of the molybdenum disulfide bulk will change significantly, when layers of the bulk are reduced to few-layer or even a monolayer. Through theoretical calculation, the researchers demonstrated that the molybdenum disulfide material with few-layer has better HER catalytic activity (Berit H., Poul G M., Bonde, K. P. Jørgensen, J. Nielsen, S. Chorkendorff, J. K Nørskov *Journal of the American Chemistry Society* 2005, 127, 5308-5309). Molybdenum disulfide based nanocomposite materials have been currently reported in many literatures (a, Li Y., Wang H., Xie L, Liang Y., Hong G, Dai H., *Journal of the American Chemistry Society* 2011, 133, 7296-7299; b, Bindumadhavan K., Srivasata S. K., Mahanty S. *Chemical Communications* 2013, 49, (18), 1823-1825) and patents (Chinese Patent of Invention ZL 201210326035.5). However, in these current studies, the catalytic performance of molybdenum disulfide based nanocomposite materials is still far behind that of platinum-based noble metal catalysts.

SUMMARY OF THE INVENTION

A purpose of the present application is to provide a $MoS_xO_y$/carbon nanocomposite material which has a better catalytic performance for electrochemical hydrogen evolution reaction than the existing $MoS_2$ based nanocomposite materials (wherein Mo represents molybdenum element, S represents sulfur element, and O represents oxygen element), preparation method therefor and use thereof (in this application, $MoS_xO_y$ is also referred to as oxygen doped molybdenum sulfide). The technical solutions are as follows:

The present application firstly provides a $MoS_xO_y$/carbon nanocomposite material, wherein 2.5≤x≤3.1, 0.2≤y≤0.7.

In a preferred embodiment of the present application, the weight percent of $MoS_xO_y$ is 5-50%, based on the total weight of the nanocomposite material.

In a preferred embodiment of the present application, the $MoS_xO_y$ has an amorphous structure.

The present application also provides a method for preparing the nanocomposite material mentioned above, wherein the method comprises:

(1) dispersing carbon source in solvent to obtain a carbon source dispersion, preferably dispersing by sonication for 30-100 minutes; the carbon source is preferably at least one selected from the group consisting of carbon black, carbon nanotube, carbon nanohorn, graphite oxide, and sulfonated graphite oxide; the solvent is preferably at least one selected from the group consisting of ethylene glycol, glycerol and water;

(2) adding a sulfur source and a molybdenum source to the carbon source dispersion to obtain a mixed solution; and (3) irradiating the mixed solution by γ-ray or electron beam; after completion of irradiation, separating and drying to obtain the nanocomposite material.

In a preferred embodiment of the present application, the sulfur source and the molybdenum source come from the same compound, and the compound is present in the mixed solution at a concentration of 1-10 mg/mL, preferably 1-5 mg/mL Preferably, the compound is at least one selected from the group consisting of ammonium tetrathiomolybdate and sodium tetrathiomolybdate.

In a preferred embodiment of the present application, the sulfur source and the molybdenum source are different compounds. The sulfur source and the molybdenum source are present in the mixed solution at a concentration of 2-10 mg/mL, and the ratio of the total moles of molybdenum atoms in the molybdenum source to the total moles of sulfur atoms in the sulfur source is 1:2-1:6.

In a preferred embodiment of the present application, the sulfur source is at least one selected from the group consisting of thiourea and sodium thiosulfate; and the molybdenum source is at least one selected from the group consisting of ammonium molybdate, molybdenum pentachloride and sodium molybdate.

In a preferred embodiment of the present application, the ratio of the carbon source to the solvent is 1-10 mg: 1 mL.

In a preferred embodiment of the present application, in step (3), the absorbed dose rate during irradiation of the mixed solution is 30-30,000 Gy/min (minute), and the absorbed dose may be 20,000-400,000 Gy.

In a preferred embodiment of the present application, the γ-ray is $^{60}$Co γ-ray; and the electron beam is generated by an electron accelerator having an energy of 0.5 to 5 MeV. In a preferred embodiment of the present application, before irradiating the mixed solution in step (3), the method further comprises a step of feeding an inert gas into the mixed solution, wherein the inert gas is preferably nitrogen, argon, or a mixed gas of them.

In a preferred embodiment of the present application, after separating in step (3), the solid product separated is successively washed by sonication with a water-miscible alcohol and water.

The present application also provides use of the MoS$_x$O$_y$/carbon nanocomposite material mentioned above in an electrochemical hydrogen evolution reaction.

The present application provides a cathode electrode, wherein the cathode electrode comprises a base electrode and the MoS$_x$O$_y$/carbon nanocomposite material mentioned above coated on the surface of the base electrode. The base electrode is an inert electrode, and is preferably selected from the group consisting of a gold electrode, a platinum electrode, a glassy carbon electrode, a graphite electrode, an ITO electrode and an FTO electrode.

The present application provides a device of hydrogen production by water electrolysis, wherein the device comprises the cathode electrode mentioned above.

The present application provides a hydrogen fuel cell device, wherein the hydrogen fuel cell device comprises a hydrogen fuel cell body and the device of hydrogen production by water electrolysis mentioned above.

The present application provides an electric equipment comprising the hydrogen fuel cell device mentioned above. The electric equipment is preferably selected from the group consisting of an electric vehicle, an electric tricycle and an electric bicycle.

The beneficial effects of the present application are as follows:

(1) In the present application, a highly conductive carbon material is used as a carbon source in the composite material, and a MoS$_x$O$_y$/carbon nanocomposite material is prepared by a radiation method, wherein the carbon material can enhance the electrical conductivity of the MoS$_x$O$_y$/carbon nanocomposite on the one hand; and the carbon material forms a three-dimensional network structure, which is beneficial to the sufficient contact between the electrolyte and the nanocomposite materials on the other hand. In addition, the generated MoS$_x$O$_y$ has an amorphous structure, which increases the number of catalytic active sites in the nanocomposite. The O element introduced by the radiation method can improve the conductivity of the nanocomposite material and further enhance the catalytic ability of the nanocomposite material.

Therefore, the MoS$_x$O$_y$/carbon nanocomposite materials prepared in the present application have better catalytic performance for electrocatalytic hydrogen evolution than other catalysts containing molybdenum disulfide. By using the MoS$_x$O$_y$/carbon nanocomposite materials prepared by the present application as a catalyst for the electrocatalytic hydrogen evolution reaction, when the overpotential is 300 mV, the current density can reach 150 mA/cm$^2$ or more, preferably 200 mA/cm$^2$ or more, and more preferably 300 mA/cm$^2$ or more. The performance is comparable to the catalytic performance of the commercial 20% Pt/C catalyst (current density of 370 mA/cm$^2$ at an overpotential of 300 mV), and is far better than the catalytic performance of existing MoS$_2$ composite materials. In addition, the MoS$_x$O$_y$/carbon nanocomposite prepared by the present application has good catalytic stability, and the current density is only decreased by 3% at an overpotential of 300 mV after 8,000 catalytic cycles, showing excellent catalytic performance and cycle stability.

(2) Compared with the traditional chemical vapor deposition or hydrothermal/solvothermal method, the radiation method has the advantages of simple preparation devices, mild reaction conditions, simple operation, good repeatability, low energy consumption, low environmental pollution, good applicability, availability in large-scale preparation and good industrial application prospects.

DESCRIPTION OF THE DRAWINGS

In order to illustrate the examples of the present application and the technical solutions of the prior art more clearly, the drawings used in the examples and the prior art will be briefly described. It is apparent that the drawings in the following description are only some examples of the application. Those skilled in the art can obtain other drawings based on these drawings without inventive efforts.

FIG. 3 is a spectrum of X-ray photoelectron spectroscopy (XPS) of the MoS$_x$O$_y$/carbon nanocomposite materials prepared in Example 1; wherein

DETAILED DESCRIPTION OF THE INVENTION

Figure 1:
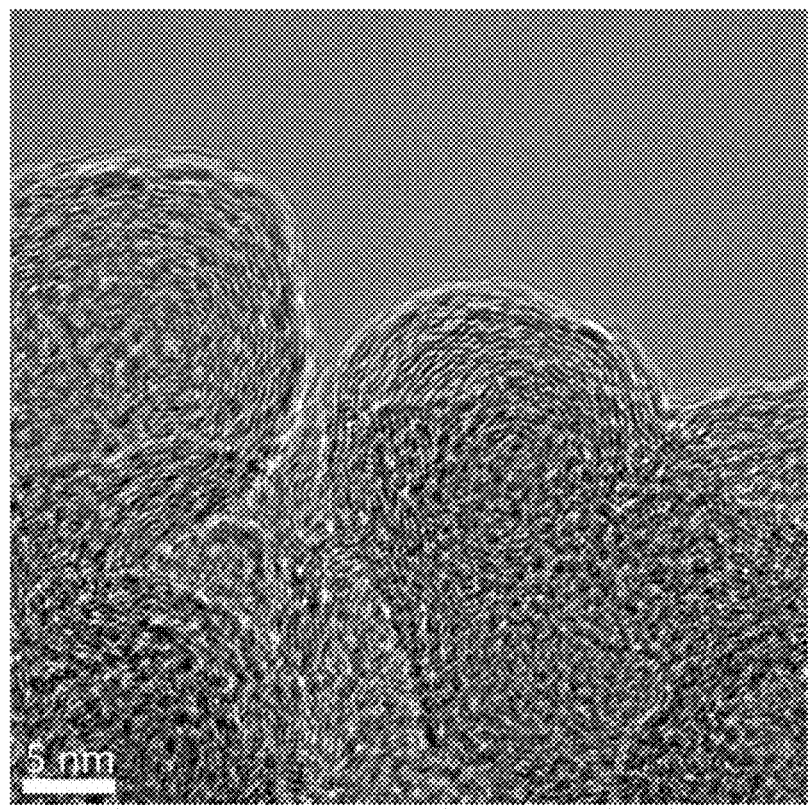
FIG. 1 is a transmission electron microscope (TEM) image of the MoS$_x$O$_y$/carbon nanocomposite materials prepared in Example 1.

The present application firstly provides a MoS$_x$O$_y$/carbon nanocomposite material, wherein 2.5≤x≤3.1, 0.2≤y≤0.7, preferably 2.6≤x≤3.1, 0.25≤y≤0.7. In a particular embodiment of the present application, based on the total weight of the nanocomposite material, the weight percent of MoS$_x$O$_y$ is 5-50%, preferably 15-40%. In a particular embodiment of the present application, the MoS$_x$O$_y$ has an amorphous structure, which is more likely to expose more catalytic active sites of reaction than the ordered crystal structure.

The present application also provides a method for preparing the nanocomposite material mentioned above, wherein the method comprises:

(1) dispersing a carbon source in a solvent to obtain a carbon source dispersion, preferably dispersing by sonication for 30-100 minutes;

in a particular embodiment of step (1), the ratio of carbon source to solvent is 1-10 mg:1 mL; the carbon source is preferably at least one selected from the group consisting of carbon black, carbon nanotube, carbon nanohorn, graphite oxide, and sulfonated graphite oxide; the solvent is preferably at least one selected from the group consisting of ethylene glycol, glycerol and water, the water is preferably deionized water; and in a particular embodiment, preferably dispersing by sonication is performed for 60-100 minutes; and the power of sonication can be 500-1,200 W.

(2) adding a sulfur source and a molybdenum source to the carbon source dispersion to obtain a mixed solution;

in a particular embodiment of step (2), the sulfur source and the molybdenum source can be the same compound, or different compounds; when the sulfur source and the molybdenum source come from the same compound, the compound contains both sulfur and molybdenum, and the compound includes but not limited to ammonium tetrathiomolybdate or sodium tetrathiomolybdate, or a combination thereof; in a particular embodiment, the compound containing both sulfur and molybdenum is present in the mixed solution at a concentration of 1-10 mg/mL, preferably 1-5 mg/mL; when the sulfur source and the molybdenum source come from the different compounds, the sulfur source includes but not limited to at least one of thiourea and sodium thiosulfate; the molybdenum source includes but not limited to at least one of ammonium molybdate, molybdenum pentachloride and sodium molybdate; the molybdenum source and the sulfur source are present in the mixed solution at a concentration of 2-10 mg/mL, and a ratio of the total moles of molybdenum atoms in the molybdenum source to the total moles of sulfur atoms in the sulfur source is 1:2-1:6;

(3) irradiating the mixed solution by a γ-ray or an electron beam; after completion of irradiation, separating and drying to obtain the nanocomposite material.

In a particular embodiment of step (3), the absorbed dose rate during irradiation of the mixed solution is 30-30,000 Gy/min, preferably 50-30,000 Gy/min, and the absorbed dose may be 20,000-400,000 Gy, preferably 50,000-400,000 Gy. The γ-ray can be produced by $^{60}$Co γ-ray source; and the electron beam is generated by an electron accelerator having an energy of 0.5 to 5 MeV. Preferably, before irradiation of the mixed solution, an inert gas may be introduced into the mixed solution for removing dissolved oxygen in the mixed solution. The inert gas may be selected from nitrogen, argon, or a mixed gas thereof; preferably selected from high purity nitrogen or high purity argon. The high purity nitrogen or high purity argon gas refers to nitrogen or argon having a purity of 99.999% or more. The separation may be carried out by conventional filtration, centrifugation or the like; and the drying may be carried out at a temperature of 30-60° C. for 12-24 hours.

Preferably, after separating in step (3), the solid product separated is successively washed by sonication with water-miscible alcohol and water, and then separated. The water-miscible alcohol is preferably ethanol. In a particular embodiment, it may be necessary to repeat the above washing-filtration operation several times to remove the solvent introduced in the step (1). In general, the separated solid product is successively washed by sonication with a water-miscible alcohol and water, preferably deionized water, and then it is subjected to a separation treatment, which can be repeated for 1-3 times.

The present application also provides use of the MoS$_x$O$_y$/carbon nanocomposite material mentioned above in the electrochemical hydrogen evolution reaction. Specifically, the MoS$_x$O$_y$/carbon nanocomposite material can be used as a catalyst for the electrochemical hydrogen evolution reaction.

The present application also provides a cathode electrode for electrolyzing water to produce hydrogen (which is an electrochemical hydrogen evolution reaction), wherein the cathode electrode comprises a base electrode and the MoS$_x$O$_y$/carbon nanocomposite material coated on the surface of the base electrode. The base electrode is an inert electrode. In a particular embodiment, the base electrode can be selected from a gold electrode, a platinum electrode, a glassy carbon electrode, a graphite electrode, an ITO electrode or an FTO electrode and the like.

The cathode electrode can be obtained by the following method: firstly dissolving a MoS$_x$O$_y$/carbon nanocomposite material and a film forming agent (for example, a Nafion membrane solution) in a solvent, dispersing uniformly to obtain a catalyst solution; and then coating the catalyst solution on the surface of the inert electrode and drying.

The present application further provides a device of hydrogen production by water electrolysis, wherein the device comprises the cathode electrode provided by the present application. It should be noted that, the device of hydrogen production by water electrolysis provided by the present application employs the cathode electrode provided by the present application. The other components required for the device of hydrogen production by water electrolysis, such as anode electrode, electrolytic cell, and electrolyte solution and the like can be implemented by the related technical solutions in the prior art, which are not defined herein.

The present application also provides a hydrogen fuel cell device, wherein the hydrogen fuel cell device comprises a hydrogen fuel cell body and the device of hydrogen production by water electrolysis provided by the present application. The device of hydrogen production by water electrolysis provided by the present application is used for supplying hydrogen gas to the hydrogen fuel cell body. The structure and preparation process of the hydrogen fuel cell body belong to the prior art. In a particular embodiment, any hydrogen fuel cell in the prior art can be used as the hydrogen fuel cell body in the present application, and the device of hydrogen production by water electrolysis provided by the present application is connected thereto for supplying hydrogen gas. The device of hydrogen production by water electrolysis can be connected to the hydrogen fuel cell body by using the related technical solutions in the prior art, which are not defined herein.

The present application also provides an electric equipment comprising the hydrogen fuel cell device mentioned above. In addition to the hydrogen fuel cell device, the other parts of the electric device can be implemented by the related technical solutions in the prior art, which are not defined herein. In the present application, the electric equipment comprises but not limited to an electric vehicle, an electric tricycle or an electric bicycle.

The technical solutions in the examples of the present application are clearly and completely described in the following with reference to the drawings in the examples of the present application. It is apparent that the described examples are only a part of the examples of the present application, not all of examples. All other examples obtained by the ordinary skilled in the art without creative work based on the examples of the present application are within the scope of the present application.

The experimental methods described in the following examples, unless otherwise specified, are conventional methods. The reagents and materials, unless otherwise specified, are commercially available.

Example 1: Preparation and Application of MoS$_x$O$_y$/Carbon Nanocomposite Material Preparation of MoS$_x$O$_y$/Carbon Nanocomposite Material 80 mg acetylene black was dispersed into 20 mL ethylene glycol (4 mg/mL), and ultrasonically dispersed for 60 minutes with an ultrasonic processor (at an ultrasonic power of 650 W) at room temperature to obtain an acetylene black dispersion. 40 mg ammonium tetrathiomolybdate was added to obtain a mixed solution. The mixed solution was transferred to an irradiated tube, high-purity nitrogen was fed for 30 minutes. The irradiated tube was sealed with a rubber stopper, and then was irradiated at room temperature in $^{60}$Co γ-ray irradiation apparatus at a dose rate of 50 Gy/min, and an absorbed dose of 50 kGy. After irradiation, the sample was filtered through a polypropylene (PP) membrane having a pore size of 0.45 μm. After filtration, filter cake was rinsed with ethanol, filtered and washed with deionized water, ultrasonically treated for 5 minutes when washing, and then the solution was filtered again after sonication, and repeated for three times to remove residual ethylene glycol. After washing, the product was dried in a vacuum oven at 40° C. for 12 hours to obtain a powdery $MoS_xO_y$/carbon nanocomposite material.

TEM characterization was performed for the $MoS_xO_y$/carbon nanocomposite material prepared, the results of which are shown in FIG. 1. It can be seen from FIG. 1 that after radiation reduction, the acetylene black material had a particle size of about 20 nm. In the $MoS_xO_y$/carbon nanocomposite material, in addition to the partially ordered structure of the acetylene black material, no ordered oxygen-doped molybdenum sulfide structure is formed because the radiation-induced reduction reaction was carried out at room temperature. Under such mild conditions, it is disadvantageous for the atoms to be arranged as an ordered crystal structure. The amorphous structure is more likely to expose more catalytic active sites than the ordered crystal structure.

Figure 2:
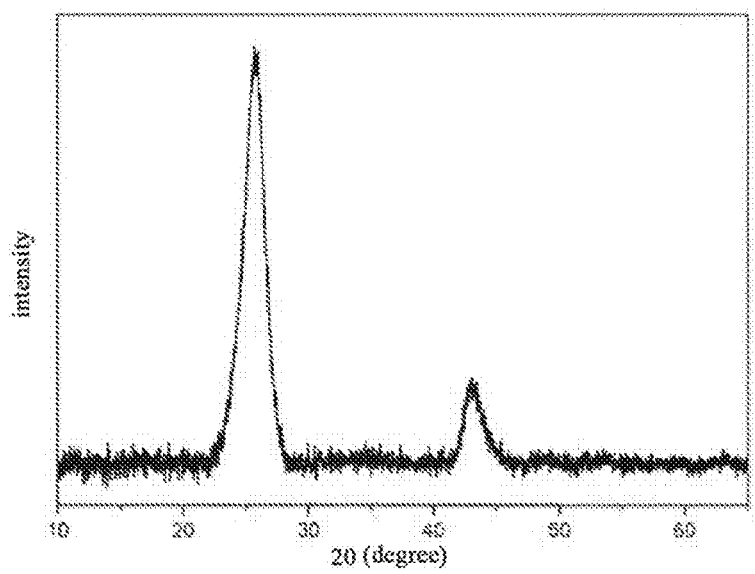
FIG. 2 is an X-ray diffraction (XRD) pattern of the MoS$_x$O$_y$/carbon nanocomposite materials prepared in Example 1.

XRD characterization was performed for the $MoS_xO_y$/carbon nanocomposite material prepared, which further verified that the formed nanocomposites did not have an ordered oxygen-doped molybdenum sulfide structure, that is, the oxygen-doped molybdenum sulfide was an amorphous structure. The results are shown in FIG. 2. In FIG. 2, the broadening peak with 2θ being about 22° is the (002) diffraction peak of carbon material, the small peak with 2θ being 43° is the (100) diffraction peak of carbon material. There are no characteristic diffraction peaks of oxygen-doped molybdenum sulfide material in the XRD pattern.

Figure 3A:
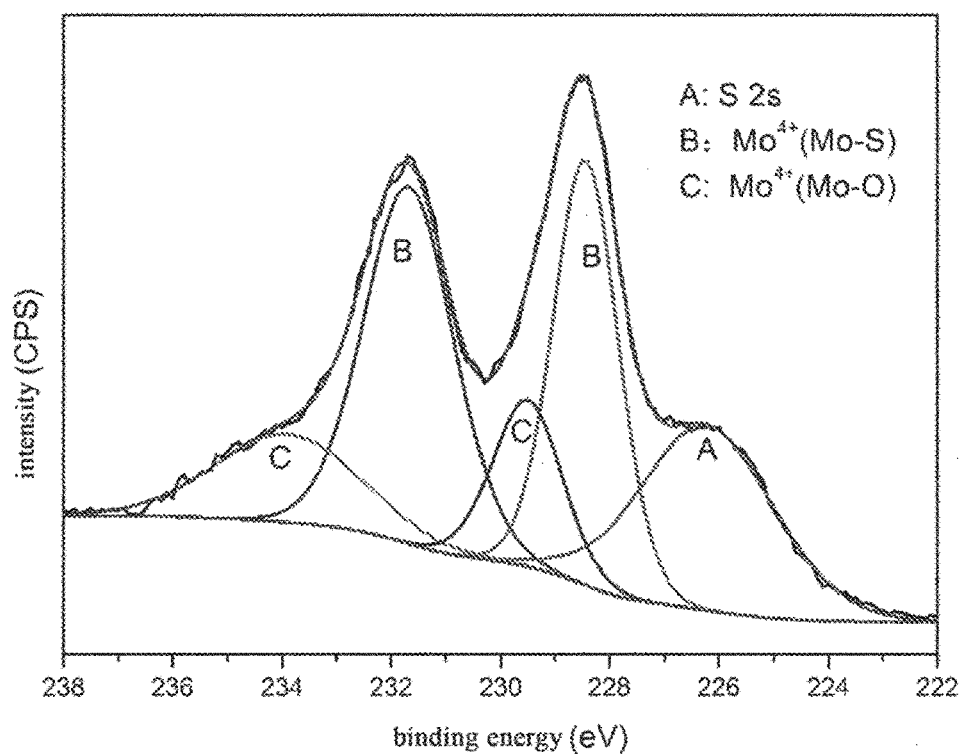
FIG. 3A is an XPS high resolution diagram of Mo.
Figure 3B:
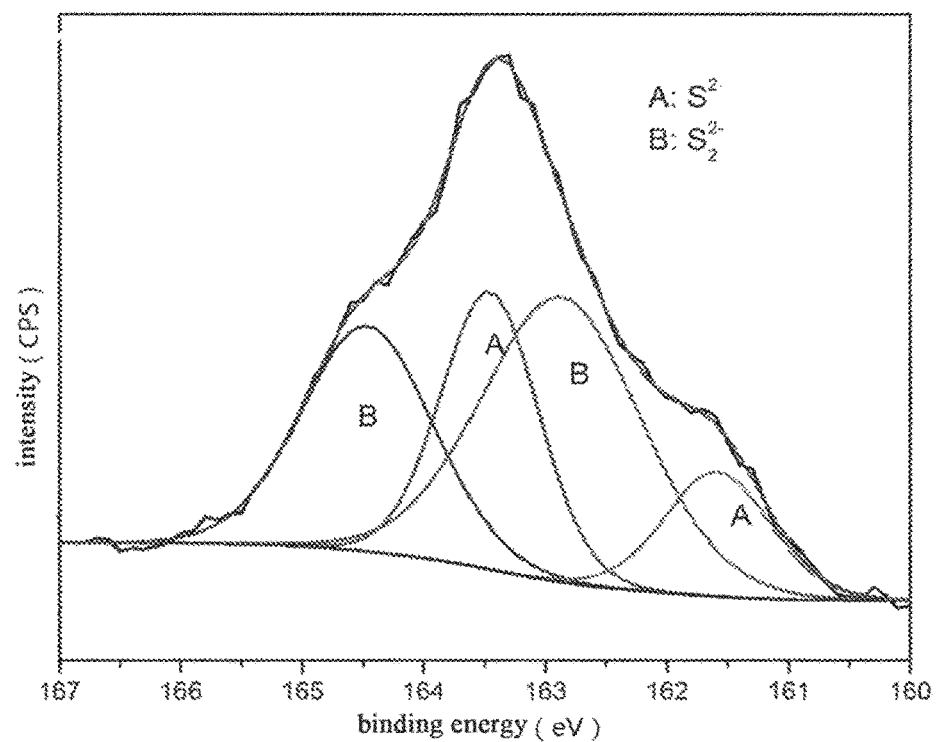
FIG. 3B is an XPS high resolution diagram of S.

XPS characterization was performed for the $MoS_xO_y$/carbon nanocomposite material prepared. The results are shown in FIG. 3A and FIG. 3B. As can be seen from FIG. 3A, molybdenum in ammonium tetrathiomolybdate was reduced to $Mo^{4+}$, and Mo—S bond and Mo—O bond coexisted. It can be seen from FIG. 3B that $S_2^{2-}$ and $S^{2-}$ coexisted in the material. The mass percentage of $MoS_xO_y$ in the $MoS_xO_y$/carbon composite material determined by inductively coupled plasma atomic emission spectroscopy (ICP-AES) was 15%, wherein x was 2.89, and in combination with XPS, y was 0.58.

Catalytic Performance Test of $MoS_xO_y$/Carbon Nanocomposite Material

The electrocatalytic hydrogen evolution reaction performance of the prepared $MoS_xO_y$/carbon nanocomposite material was tested by a three-electrode system. A saturated calomel electrode (SCE) was used as the reference electrode, and a 1 cm² Pt electrode was used as the counter electrode. A glassy carbon electrode coated with $MoS_xO_y$/carbon nanocomposite material on the surface was used as the working electrode, and 0.5 M $H_2SO_4$ was used as the electrolyte. The Shanghai Chenhua's CHI 760e electrochemical workstation was used for testing.

The working electrode was prepared by a drop casting method. In particular, 4 mg $MoS_xO_y$/carbon black nanocomposite material was weighed and dispersed in a 1 mL mixed solvent of ultrapure water/ethanol ($V_{water}:V_{ethanol}$=4:1), then 40 μL 5% Nafion membrane solution was added, and a uniform catalyst solution was obtained after ultrasonic dispersion by an ultrasonic processor for more than 30 minutes at room temperature. 2, 3, 4, 5, 6 and 8 μL of the catalyst solution was respectively drop cast on the surface of an L-type glassy carbon electrode having a diameter of 3 mm, which has been smoothly polished. The working electrode with a catalyst loading of 0.110, 0.165, 0.220, 0.275, 0.330 and 0.440 mg/cm² was formed after the surface was completely dried, and was used for linear sweep voltammetry (LSV). The test results are shown in FIG. 4 and FIG. 5.

Testing parameters: the linear sweep voltammetry test (LSV) has a sweep rate of 5 mV/s and a scan range of 0.2 to −0.4 V (relative to the reversible hydrogen electrode (RHE for short)). The cyclic voltammetry test has a sweep rate of 50 mV/s and a scan range of 0 to −0.3 V (relative to RHE).

Figure 4:
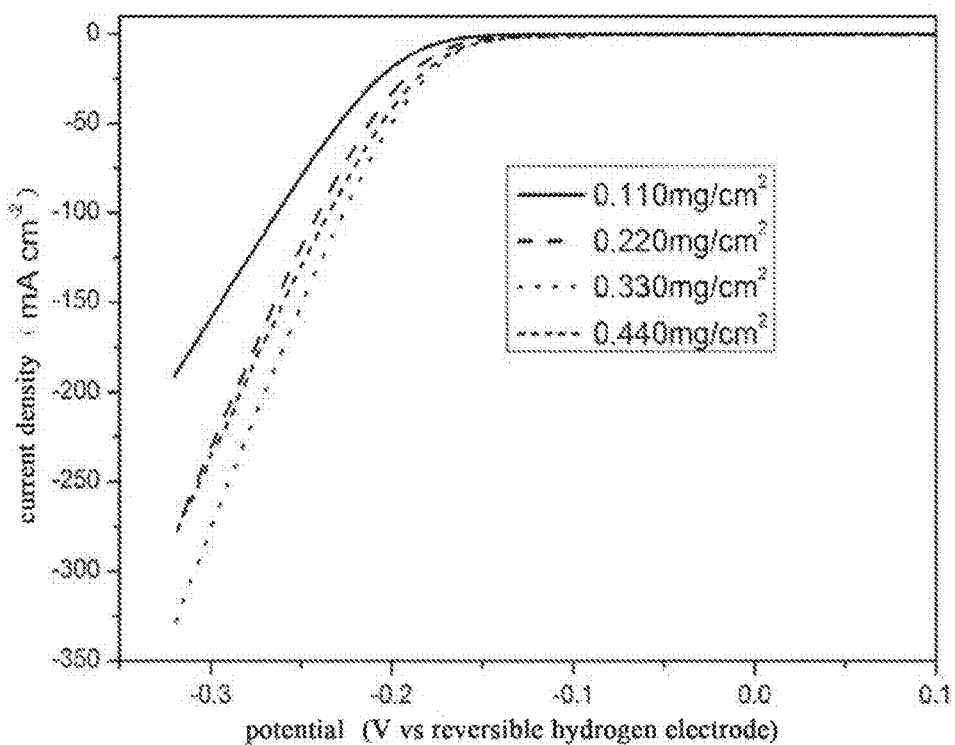
FIG. 4 is a linear sweep voltammetry test (LSV) diagram of the MoS$_x$O$_y$/carbon nanocomposite materials prepared in Example 1 on a glassy carbon electrode at different loading.

It can be seen from FIG. 4 that when the loading of the catalyst on the glassy carbon electrode was increased from 0.110 mg/cm² to 0.330 mg/cm², the current density also increased accordingly, indicating that the catalytic performance can be improved by increasing the catalyst loading within this loading range. However, the increase of current density is not proportional to the catalyst content, indicating that the catalyst utilization rate decreases, and as the catalyst loading continues to increase, the excess catalyst may hinder the mass transfer step between the proton of the hydrogen evolution reaction and the surface of catalyst, resulting in a continued decrease in the utilization of the catalyst and a decrease in the current density.

Figure 5:
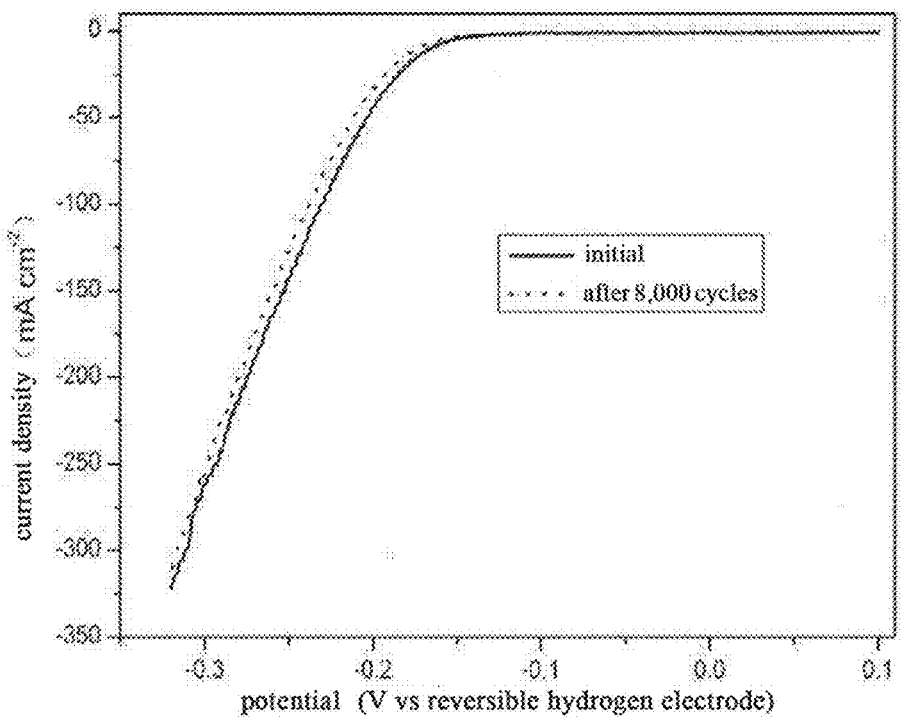
FIG. 5 is a linear sweep voltammetry test (LSV) diagram of the MoS$_x$O$_y$/carbon nanocomposite materials prepared in Example 1 after catalytic cycles.

FIG. 5 is a linear sweep voltammetry (LSV) diagram of the $MoS_xO_y$/carbon nanocomposite material after catalytic cycles. As can be seen from FIG. 5, the $MoS_xO_y$/carbon nanocomposite material has very good catalytic stability. The current density only decreased by 3% at an overpotential of 300 mV after 8,000 catalytic cycles. There is a slight increase in the catalytic initial voltage of the composite material for the HER reaction due to the partial inactivation of some active sites during the catalysis.

Example 2: Preparation of $MoS_xO_y$/Carbon Nanocomposite Material

The $MoS_xO_y$/carbon nanocomposite material was prepared under the conditions of Example 1 except that acetylene black in Example 1 was replaced by carbon nanotube. The mass percentage of $MoS_xO_y$ in the composite material was 17%, wherein x was 2.91 and y was 0.58.

Example 3: Preparation of $MoS_xO_y$/Carbon Nanocomposite Material

The $MoS_xO_y$/carbon nanocomposite material was prepared under the conditions of Example 1 except that acetylene black in Example 1 was replaced by graphite oxide. The mass percentage of $MoS_xO_y$ in the composite material was 21%, wherein x was 2.81 and y was 0.69.

Example 4: Preparation of $MoS_xO_y$/Carbon Nanocomposite Material

The $MoS_xO_y$/carbon nanocomposite material was prepared under the conditions of Example 1 except that acetylene black in Example 1 was replaced by carbon nanohorn. The mass percentage of $MoS_xO_y$ in the composite material was 19%, wherein x was 2.85 and y was 0.51.

Example 5: Preparation of $MoS_xO_y$/Carbon Nanocomposite Material

The $MoS_xO_y$/carbon nanocomposite material was prepared under the conditions of Example 1 except that acetylene black in Example 1 was replaced by sulfonated graphite oxide. The mass percentage of $MoS_xO_y$ in the composite material was 24%, wherein x was 2.83 and y was 0.56.

Example 6: Preparation of $MoS_xO_y$/C Nanocomposite Material

The $MoS_xO_y$/carbon nanocomposite material was prepared under the conditions of Example 1 except that the absorbed dose rate in Example 1 was altered to 150 Gy/min. The mass percentage of $MoS_xO_y$ in the composite material was 20%, wherein x was 2.94 and y was 0.63.

Example 7: Preparation of $MoS_xO_y$/C Nanocomposite Material

The $MoS_xO_y$/carbon nanocomposite material was prepared under the conditions of Example 1 except that the absorbed dose rate in Example 1 was altered to 300 Gy/min. The mass percentage of $MoS_xO_y$ in the composite material was 25%, wherein x was 3.07 and y was 0.69.

Example 8: Preparation of $MoS_xO_y$/Carbon Nanocomposite Material

The $MoS_xO_y$/carbon nanocomposite material was prepared under the conditions of Example 1 except that the absorbed dose in Example 1 was altered to 150 kGy. The mass percentage of $MoS_xO_y$ in the composite material was 24%, wherein x was 2.81 and y was 0.45.

Example 9: Preparation of $MoS_xO_y$/Carbon Nanocomposite Material

The $MoS_xO_y$/carbon nanocomposite material was prepared under the conditions of Example 1 except that the absorbed dose in Example 1 was altered to 300 kGy. The mass percentage of $MoS_xO_y$ in the composite material was 26%, wherein x was 2.69 and y was 0.35.

Example 10: Preparation of $MoS_xO_y$/Carbon Nanocomposite Material

The $MoS_xO_y$/carbon nanocomposite material was prepared under the conditions of Example 1 except that the solvent in Example 1 was altered to glycerol. The mass percentage of $MoS_xO_y$ in the composite material was 22%, wherein x was 2.85 and y was 0.33.

Example 11: Preparation of $MoS_xO_y$/Carbon Nanocomposite Material

The $MoS_xO_y$/carbon nanocomposite material was prepared under the conditions of Example 1 except that the solvent in Example 1 was altered to deionized water. The mass percentage of $MoS_xO_y$ in the composite material was 24%, wherein x was 2.81 and y was 0.45.

Example 12: Preparation of $MoS_xO_y$/Carbon Nanocomposite Material

The $MoS_xO_y$/carbon nanocomposite material was prepared under the conditions of Example 1 except that 20 mg ammonium tetrathiomolybdate in Example 1 was replaced by 20 mg ammonium molybdate and 30 mg thiourea, and the absorbed dose in Example 1 was altered to 200 kGy. The mass percentage of $MoS_xO_y$ in the composite material was 35%, wherein x was 2.75 and y was 0.33.

Example 13: Preparation of $MoS_xO_y$/Carbon Nanocomposite Material

The $MoS_xO_y$/carbon nanocomposite material was prepared under the conditions of Example 1 except that 20 mg ammonium tetrathiomolybdate in Example 1 was replaced by 20 mg ammonium molybdate and 40 mg thiourea, the absorbed dose rate in Example 1 was altered to 1,000 Gy/min, and the absorbed dose in Example 1 was altered to 200 kGy. The mass percentage of $MoS_xO_y$ in the composite material was 35%, wherein x was 2.72 and y was 0.41.

Example 14: Preparation of $MoS_xO_y$/Carbon Nanocomposite Material

The $MoS_xO_y$/carbon nanocomposite material was prepared under the conditions of Example 1 except that 20 mg ammonium tetrathiomolybdate in Example 1 was replaced by 20 mg sodium molybdate and 40 mg thiourea, the $^{60}$Co γ-ray in Example 1 was replaced by an electron beam produced by an electron accelerator with an energy of 0.6 MeV, the absorbed dose rate in Example 1 was altered to 1,000 Gy/min, and the absorbed dose in Example 1 was altered to 200 kGy. The mass percentage of $MoS_xO_y$ in the composite material was 37%, wherein x was 2.75 and y was 0.27.

Example 15: Preparation of $MoS_xO_y$/Carbon Nanocomposite Material

The $MoS_xO_y$/carbon nanocomposite material was prepared under the conditions of Example 1 except that 20 mg ammonium tetrathiomolybdate in Example 1 was replaced by 20 mg sodium molybdate and 60 mg sodium thiosulfate, the $^{60}$Co γ-ray in Example 1 was replaced by an electron beam produced by an electron accelerator with an energy of 3 MeV, the absorbed dose rate in Example 1 was altered to 15 kGy/min, and the absorbed dose in Example 1 was altered to 400 kGy. The mass percentage of $MoS_xO_y$ in the composite material was 35%, wherein x was 2.81 and y was 0.28.

Example 16: Preparation of $MoS_xO_y$/Carbon Nanocomposite Material

The $MoS_xO_y$/carbon nanocomposite material was prepared under the conditions of Example 1 except that the $^{60}$Co γ-ray in Example 1 was replaced by an electron beam produced by an electron accelerator with an energy of 5 MeV, the absorbed dose rate in Example 1 was altered to 30 kGy/min, and the absorbed dose in Example 1 was altered to 200 kGy. The mass percentage of $MoS_xO_y$ in the composite material was 35%, wherein x was 3.10 and y was 0.60.

It should be noted that in each of the above examples, 1 kGy=1000 Gy.

The catalytic performance for electrocatalytic hydrogen evolution reaction of $MoS_xO_y$/carbon nanocomposite materials prepared in Examples 2-16 were tested according to the method and test conditions described in Example 1. The results are recorded in Table 1 together with the test results in Example 1.

TABLE 1

Comparison of catalytic performances of $MoS_xO_y$/carbon nanocomposite materials prepared in Examples 1-16

| Examples | Catalyst loading (mg/cm$^2$) | Initial overpotential η (mV) | Current density j (mA/cm$^2$) | Corresponding overpotential$^a$ η (mV) | Current density at η = 300 mV j (mA/cm$^2$) | Tafel slope (mV/dec) |
|---|---|---|---|---|---|---|
| Example 1 | 0.275 | 120 | 10 | 160 | 260 | 41 |
| Example 2 | 0.275 | 120 | 10 | 156 | 272 | 40 |
| Example 3 | 0.275 | 150 | 10 | 195 | 170 | 56 |
| Example 4 | 0.275 | 150 | 10 | 193 | 210 | 48 |
| Example 5 | 0.275 | 162 | 10 | 192 | 152 | 63 |
| Example 6 | 0.275 | 122 | 10 | 162 | 285 | 39 |
| Example 7 | 0.275 | 117 | 10 | 154 | 321 | 38 |
| Example 8 | 0.275 | 121 | 10 | 159 | 304 | 40 |
| Example 9 | 0.275 | 120 | 10 | 164 | 297 | 42 |
| Example10 | 0.275 | 125 | 10 | 167 | 269 | 41 |
| Example11 | 0./75 | 121 | 10 | 163 | 304 | 42 |
| Example12 | 0.275 | 145 | 10 | 190 | 200 | 57 |
| Example13 | 0.275 | 148 | 10 | 195 | 189 | 58 |
| Example14 | 0.275 | 150 | 10 | 199 | 182 | 60 |
| Example15 | 0.275 | 150 | 10 | 198 | 190 | 60 |
| Example16 | 0.275 | 118 | 10 | 156 | 332 | 38 | a, the corresponding overpotential refers to the overpotential when the current density is 10 mA/cm$^2$ as listed in the previous column; mV/dec represents the value of the change in potential when the current density changes by an order of magnitude, and dec is the abbreviation of decade.

Comparative Examples 1-11

11 kinds of catalysts for electrocatalytic hydrogen evolution reaction were prepared according to the description of the references in Table 2. The electrocatalytic hydrogen evolution reaction performances of the 11 kinds of catalysts prepared in Comparative Examples 1-11 were tested according to the method and test conditions described in Example 1. The test results are shown in Table 2. The references in Table 2 are incorporated into the present application by reference in their entireties, which are not repeated in this application.

TABLE 2

Comparison of catalytic performances of the catalysts prepared in Comparative Examples 1-11

| | Catalyst | Catalyst loading (mg/cm$^2$) | Initial overpotential η (mV) | Current density j (mA/cm$^2$) | Corresponding overpotential$^a$ η (mV) | Current density at η = 300 mV j (mA/cm$^2$) | Tafel slope (mV/dec) | References |
|---|---|---|---|---|---|---|---|---|
| Comparative Example 1 | defect-abundant $MoS_2$ | 0.285 | 120 | 13 | 200 | ~80 | 50 | 1 |
| Comparative Example 2 | amorphous $MoS_2$ | / | 150 | 10 | ~00 | <100 | ~60 | 2 |
| Comparative Example 3 | 1T $MoS_2$ | / | / | 10 | 195 | 150 | 54 | 3 |
| Comparative Example 4 | $MoS_2$ with few layers | 0.285 | 90 | 10 | 248 | 20 | 61 | 4 |
| Comparative Example 5 | 2H-$MoS_2$ | 0.205 | 112 | 10 | 214 | 55 | 74 | 5 |
| Comparative Example 6 | $MoS_2$/rGO | 0.285 | ~100 | 10 | ~155 | ~120 | 41 | 6 |
| Comparative Example 7 | GA-$MoS_2$ | 0.56 | ~100 | 10 | 165 | / | 41 | 7 |
| Comparative Example 8 | $MoS_2$ with high curvature | / | 130 | 10 | ~230$^b$ | <30 | 50$^b$ | 8 |
| Comparative Example 9 | $MoS_2$/Au | / | 90 | 10 | ~225 | <50 | 69 | 9 |
| Comparative Example 10 | Au/$MoS_2$ | 0.275 | 120 | 10 | ~260 | 30 | 71 | 10 |
| Comparative Example 11 | $MoS_2$/rGO | 0.20 | 140 | 10 | ~180 | ~130 | 41 | 11 | a, the corresponding overpotential refers to the overpotential when the current density is essentially 10 mA/cm² as listed in previous column.

b, these data have been processed by iR-correction.

The references in Table 2 are as follows:
1, Xie J., Zhang H., Li S., Wang R., Sun X., Zhou M., Zhou J., Lou X., Xie Y. *Advanced Materials* 2013, 25 (40), 5807-5813.
2, Benck J. D., Chen Z., Kuritzky L. Y., Forman A. J., Jaramillo T. F. *ACS Catalysis* 2012, 2 (9), 1916-1923.
3, Lukowski M. A., Daniel A. S., Meng F., Forticaux A., Li L., Jin S., *Journal of the American Chemical Society* 2013, 135 (28), 10274-10277.
4, Benson J., Li M., Wang S., Wang P., Papakonstantinou P. *ACS Applied Materials & Interfaces* 2015, 7 (25), 14113-14122.
5, Guo B., Yu K., Li H., Song H., Zhang Y., Lei X., Fu H., Tan Y., Zhu Z. *ACS Applied Materials & Interfaces* 2016, 8 (8), 5517-5525.
6, Li Y., Wang H., Xie L., Liang Y., Hong G, Dai H. *Journal of the American Chemical Society* 2011, 133 (19), 7296-7299.
7, Zhao Y., Xie X., Zhang J., Liu H., Ahn H., Sun K., Wang G *Chemistry—A European Journal* 2015, 21 (45), 15908-15913.
8, Kibsgaard J., Chen Z., Reinecke B. N., Jaramillo T. F. *Nature Materials* 2012, 11 (11), 963-969.
9, Wang T., Liu L., Zhu Z., Papakonstantinou P., Hu J., Liu H., Li M. *Energy & Environmental Science* 2013, 6 (2), 625-633.
10, Shi Y. Wang J., Wang C., Zhai T., Bao W., Xu J., Xia X., Chen H. *Journal of the American Chemical Society* 2015, 137 (23), 7365-7370.
11, Zheng X., Xu J., Yan K., Wang H., Wang Z., Yang S. *Chemistry of Materials* 2014, 26 (7), 2344-2353.

By comprehensively analyzing Table 1 and Table 2, it can be known that when the $MoS_xO_y$/carbon nanocomposite materials prepared in the examples of the present application are used as catalysts for electrocatalytic hydrogen evolution reactions, they have a low Tafel slopes and initial overpotentials, and have large current densities at lower overpotentials. For example, when the materials prepared in Examples 1-16 of the present application are used as catalysts, the current densities at overpotentials of 300 mV are 150 mA/cm² or more, the current densities of many examples can reach 200 mA/cm² or more, and the better ones can reach 300 mA/cm² or more. These performances are comparable to the catalytic performance of the commercial 20% Pt/C catalyst (current density of 370 mA/cm² at an overpotential of 300 mV).

For the catalysts prepared in Comparative Examples 1-11, the current densities at an overpotential of 300 mV are significantly lower than that of the present application, and the maximum current density is also less than 150 mA/cm². Moreover, their preparation methods are complicated, the material cost is relatively high, and their catalytic performances are limited, which is far from meeting the requirement for practical industrial applications.

In addition, when the materials prepared in the examples of the present application are used as catalysts, the overpotentials at 10 mA/cm² are 200 mV or less, and when the materials prepared in Comparative Examples 1-11 are used as catalysts, the overpotentials at 10 mA/cm² are mostly 200 mV or higher.

It can be seen that the $MoS_xO_y$/carbon nanocomposite materials provided by the present application are prepared by a simpler method, lower in cost, and have more excellent catalytic performances than the catalysts prepared in Comparative Examples 1-11, and can meet requirements in the industrial production.

The above description is obtained by only the preferred examples of the present application, and is not intended to limit the present application. Any modifications, equivalent substitutions, improvements, etc., which are made within the spirit and principles of the present application, should be included within the scope of claims of the present application.

The invention claimed is:

1. A $MoS_xO_y$/carbon nanocomposite material, wherein $2.5 \leq x \leq 3.1$, $0.2 \leq y \leq 0.7$.

2. The nanocomposite material according to claim 1, wherein the $MoS_xO_y$ accounts for 5-50% in mass, based on the total mass of the nanocomposite material.

3. The nanocomposite material according to claim 2, wherein the $MoS_xO_y$ has an amorphous structure.

4. A cathode electrode, wherein the cathode electrode comprises a base electrode and the $MoS_xO_y$/carbon nanocomposite material according to claim 1 coated on the surface of the base electrode, wherein the base electrode is an inert electrode.

5. The cathode electrode according to claim 4, wherein the base electrode is selected from the group consisting of a glassy carbon electrode, a graphite electrode, an ITO electrode and an FTO electrode.

6. A device of hydrogen production by water electrolysis, wherein the device comprises the cathode electrode according to claim 4.

7. A hydrogen fuel cell device, wherein the hydrogen fuel cell device comprises a hydrogen fuel cell body and the device of hydrogen production by water electrolysis according to claim 6.

8. An electric equipment comprising the hydrogen fuel cell device according to claim 7.

9. The electric equipment according to claim 8, wherein the electric equipment is an electric vehicle, an electric tricycle or an electric bicycle.

10. A method for preparing the nanocomposite material according to claim 1, comprising:
(1) dispersing a carbon source in a solvent to obtain a carbon source dispersion;
(2) adding a sulfur source and a molybdenum source to the carbon source dispersion to obtain a mixed solution; and
(3) irradiating the mixed solution by a γ-ray or an electron beam; after irradiation, separating and drying to obtain the nanocomposite material.

11. The method for preparing the nanocomposite material according to claim 10, wherein the sulfur source and the molybdenum source come from the same compound, and the compound is present in the mixed solution at a concentration of 1-10 mg/mL, or 1-5 mg/mL;

or the sulfur source and the molybdenum source come from the different compounds, wherein the molybdenum source and the sulfur source are present in the mixed solution at a concentration of 2-10 mg/mL; a ratio of the total moles of molybdenum atoms in the molybdenum source to the total moles of sulfur atoms in the sulfur source is 1:2-1:6.

12. The method for preparing the nanocomposite material according to claim 11, wherein the sulfur source and the molybdenum source come from the same compound, and the compound is at least one selected from the group consisting of ammonium tetrathiomolybdate and sodium tetrathiomolybdate; and/or the sulfur source and the molybdenum source come from the different compounds, the sulfur source is at least one selected from the group consisting of thiourea and sodium thiosulfate, and the molybdenum source is at least one selected from the group consisting of ammonium molybdate, molybdenum pentachloride, and sodium molybdate.

13. The method for preparing the nanocomposite material according to claim 10, wherein a ratio of the carbon source to the solvent is 1-10 mg:1 mL.

14. The method for preparing the nanocomposite material according to claim 10, wherein in step (3), an absorbed dose rate during irradiation of the mixed solution is 30-30,000 Gy/min, and an absorbed dose is 20,000-400,000 Gy.

15. The method for preparing the nanocomposite material according to claim 10, wherein the γ-ray is produced by $^{60}$Co source; and the electron beam is generated by an electron accelerator having an energy of 0.5-5 MeV.

16. The method for preparing the nanocomposite material according to claim 10, wherein before irradiating the mixed solution in step (3), the method further comprises a step of feeding an inert gas into the mixed solution.

17. The method for preparing the nanocomposite material according to claim 16, wherein the inert gas is nitrogen, argon, or a mixture thereof.

18. The method for preparing the nanocomposite material according to claim 10, wherein after separating in step (3), a solid product separated is successively washed by sonication with a water-miscible alcohol and water.

19. The method for preparing the nanocomposite material according to claim 10, wherein the carbon source is dispersed by sonication for 30-100 minutes; and/or the carbon source is at least one selected from the group consisting of carbon black, carbon nanotube, carbon nanohorn, graphite oxide and sulfonated graphite oxide; and/or the solvent is at least one selected from the group consisting of ethylene glycol, glycerol and water.

20. A method of conducting an electrochemical hydrogen evolution reaction comprising utilizing the $MoS_xO_y$/carbon nanocomposite material according to claim 1 in conducting the electrochemical hydrogen evolution reaction.

* * * * *